(12) United States Patent
Saieg et al.

(10) Patent No.: US 9,333,826 B1
(45) Date of Patent: May 10, 2016

(54) AXLE SUSPENSION SYSTEM AND METHOD OF MANUFACTURE

(71) Applicant: ArvinMeritor Technology, LLC, Troy, MI (US)

(72) Inventors: Steven George Saieg, Rochester Hills, MI (US); Craig Allen Holt, Chesterfield, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 14/638,049

(22) Filed: Mar. 4, 2015

(51) Int. Cl.
*B60G 9/00* (2006.01)
*B60G 7/00* (2006.01)

(52) U.S. Cl.
CPC ............... *B60G 9/003* (2013.01); *B60G 7/001* (2013.01); *B60G 2200/31* (2013.01); *B60G 2204/10* (2013.01); *B60G 2206/82* (2013.01)

(58) Field of Classification Search
CPC ............. B60G 9/003; B60G 2204/10; B60G 2200/31; B60G 2206/82; B60G 7/001
See application file for complete search history.

(56) References Cited

U.S. PATENT DOCUMENTS

| 5,037,126 | A | * | 8/1991 | Gottschalk | B60G 9/003 280/124.116 |
|---|---|---|---|---|---|
| 5,639,110 | A | * | 6/1997 | Pierce | B60G 7/001 280/124.11 |
| 5,690,353 | A | * | 11/1997 | Vandenberg | B60G 7/001 280/124.116 |
| 5,988,672 | A | * | 11/1999 | VanDenberg | B60G 11/64 280/124.11 |
| 6,557,875 | B2 | * | 5/2003 | Schlosser | B60G 7/001 280/124.128 |
| 6,827,360 | B2 | * | 12/2004 | Chan | B60G 7/001 280/124.116 |
| 7,740,255 | B2 | * | 6/2010 | Holt | B60G 7/001 280/124.11 |
| 8,006,987 | B2 | | 8/2011 | Saieg et al. | |
| 8,333,396 | B2 | | 12/2012 | Saieg et al. | |
| 8,678,407 | B2 | * | 3/2014 | Eveley | B60G 7/001 280/124.11 |
| 8,998,229 | B2 | * | 4/2015 | Michel | B60G 5/06 280/124.116 |
| 2004/0036246 | A1 | * | 2/2004 | Chan | B60G 9/003 280/124.166 |

* cited by examiner

*Primary Examiner* — Faye M Fleming
(74) *Attorney, Agent, or Firm* — Brooks Kushman P.C.

(57) ABSTRACT

An axle suspension system and a method of manufacture. The axle suspension system may include a trailing arm assembly disposed on an axle wrap. The trailing arm assembly may include a lower portion and an upper portion. The lower portion may have a lower intermediate wall. The upper portion may be fixedly disposed on the lower portion and may have an upper intermediate wall. The lower intermediate wall and upper intermediate wall may be spaced apart from the axle wrap.

19 Claims, 4 Drawing Sheets

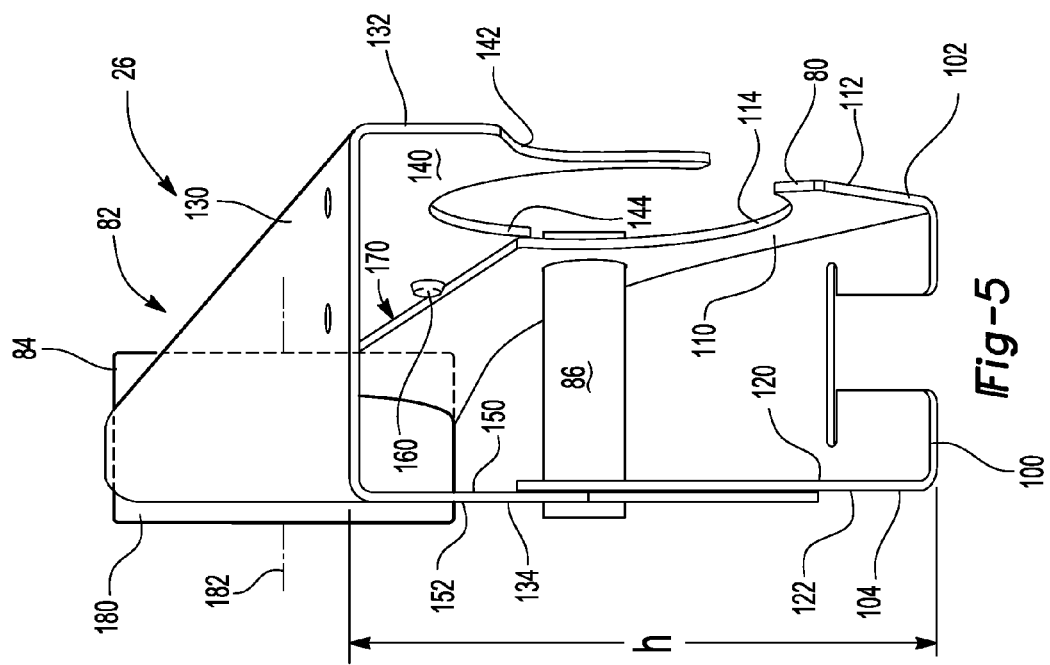
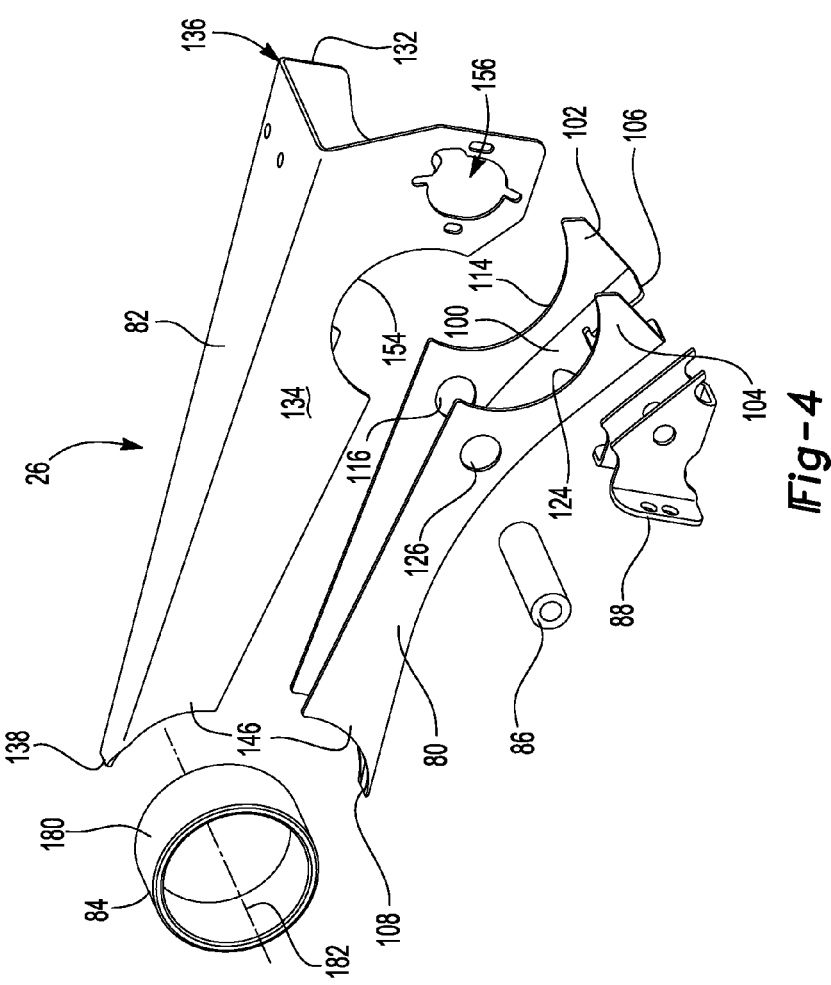

AXLE SUSPENSION SYSTEM AND METHOD OF MANUFACTURE

TECHNICAL FIELD

This patent application relates to an axle suspension system and a method of manufacture.

BACKGROUND

A top mount trailing arm suspension is disclosed in U.S. Pat. No. 8,333,396.

SUMMARY

In at least one embodiment, an axle suspension system is provided. The axle suspension system may include an axle, an axle wrap, and a trailing arm assembly. The axle may extend along an axis. The axle wrap may be disposed on the axle. The trailing arm assembly may be disposed on the axle wrap and may include a lower portion and an upper portion. The lower portion may have a lower intermediate wall, a first lower portion side wall, and a second lower portion side wall. The first lower portion side wall may extend from the lower intermediate wall. The second lower portion side wall may extend from the lower intermediate wall and may be disposed opposite the first lower portion side wall. The first lower portion side wall and the second lower portion side wall may be disposed on the axle wrap. The upper portion may be fixedly disposed on the lower portion. The upper portion may have an upper intermediate wall, a first upper portion side wall, and a second upper portion side wall. The first upper portion side wall may extend from the upper intermediate wall. The second upper portion side wall may extend from the upper intermediate wall and may be disposed opposite the first upper portion side wall. The first upper portion side wall and the second upper portion side wall may be disposed on the axle wrap. The lower intermediate wall and the upper intermediate wall may be spaced apart from the axle wrap and may be disposed on opposite sides of the axis.

In at least one embodiment, an axle suspension system is provided. The axle suspension system may include an axle, an axle wrap, a trailing arm assembly, and a hanger bracket. The axle may extend along an axis. The axle wrap may be fixedly disposed on the axle and may extend at least partially around the axle. The trailing arm assembly may be fixedly disposed on the axle wrap. The trailing arm assembly may include a lower portion and an upper portion. The lower portion may include a bushing ring and first and second lower portion side walls. The bushing ring may extend continuously about a bushing ring axis. The bushing ring may be disposed at an end of the lower portion that may be disposed opposite the axle wrap. The first and second lower portion side walls may extend from the bushing ring to the axle wrap. The upper portion may be fixedly disposed on the lower portion. The upper portion may include first and second upper side walls that may extend from the bushing ring to the axle wrap. The hanger bracket may be spaced apart from the axle and may be pivotally mounted to the trailing arm assembly proximate the bushing ring.

In at least one embodiment, a method of making an axle suspension system is provided. The method may include fixedly mounting an axle wrap on an axle. A trailing arm assembly having an upper portion and a lower portion may be assembled to the axle wrap by positioning the upper portion and the lower portion on the axle wrap such that the axle wrap is disposed between the upper portion and the lower portion. The upper portion and the lower portion may be joined to each other and to the axle wrap.

BRIEF DESCRIPTION OF THE DRAWINGS

FIG. 4 is an exploded perspective view of an exemplary trailing arm assembly.

FIG. 5 is a rear perspective view of the trailing arm assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
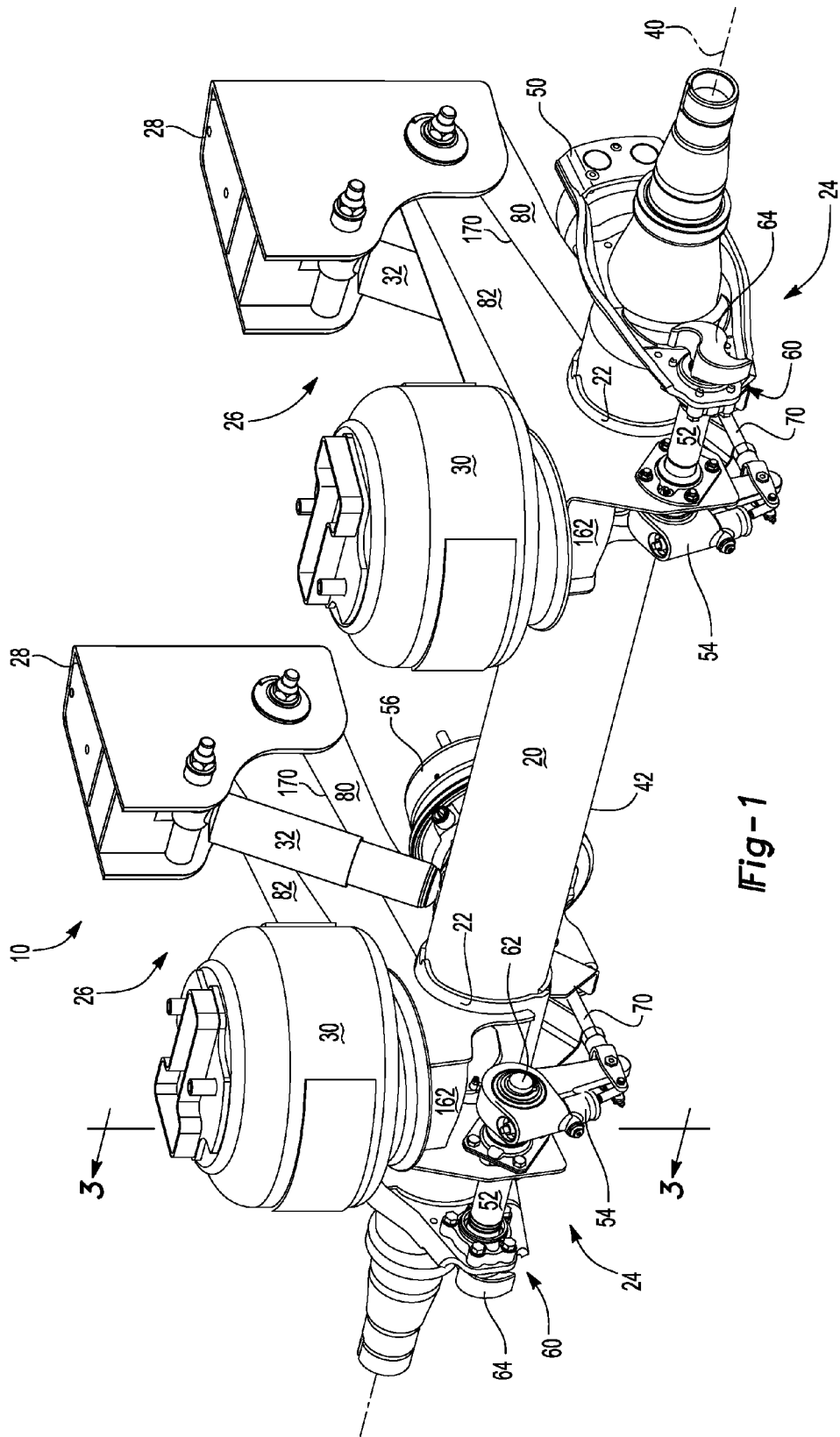
FIG. 1 is a perspective view of an exemplary axle suspension system.

Referring to FIG. 1, an exemplary axle suspension system 10 is shown. The axle suspension system 10 may be provided with a vehicle, such as motor vehicle or a trailer that may be provided with a motor vehicle. The axle suspension system 10 may include an axle 20, an axle wrap 22, a brake subsystem 24, a trailing arm assembly 26, a hanger bracket 28, an air spring 30, and a shock absorber 32. In FIG. 1, a pair of axle wraps 22 is provided and one brake subsystem 24, trailing arm assembly 26, hanger bracket 28, air spring 30, and shock absorber 32 is associated with each axle wrap 22.

The axle 20 may extend along an axis 40 and may have an exterior surface 42. The exterior surface 42 may extend about an exterior circumference of the axle 20.

The axle wrap 22 may be fixedly disposed on the axle 20. The axle wrap 22 may extend at least partially around the exterior surface 42 of the axle 20. For example, the axle wrap 22 may partially extend around the exterior surface 42 of the axle 20 or the axle wrap 22 may extend completely around exterior surface 42 of the axle 20. In FIG. 1, two axle wraps 22 are provided that are completely spaced apart from each other. The axle wrap 22 may be positioned between an associated trailing arm assembly 26 and the axle 20 and may facilitate mounting of the trailing arm assembly 26 to the axle 20.

At least one wheel hub assembly may be rotatably disposed on the axle 20. A wheel hub assembly may be provided at each end of the axle 20. Each wheel hub assembly may be configured to receive a wheel upon which a tire may be mounted.

Figure 2:
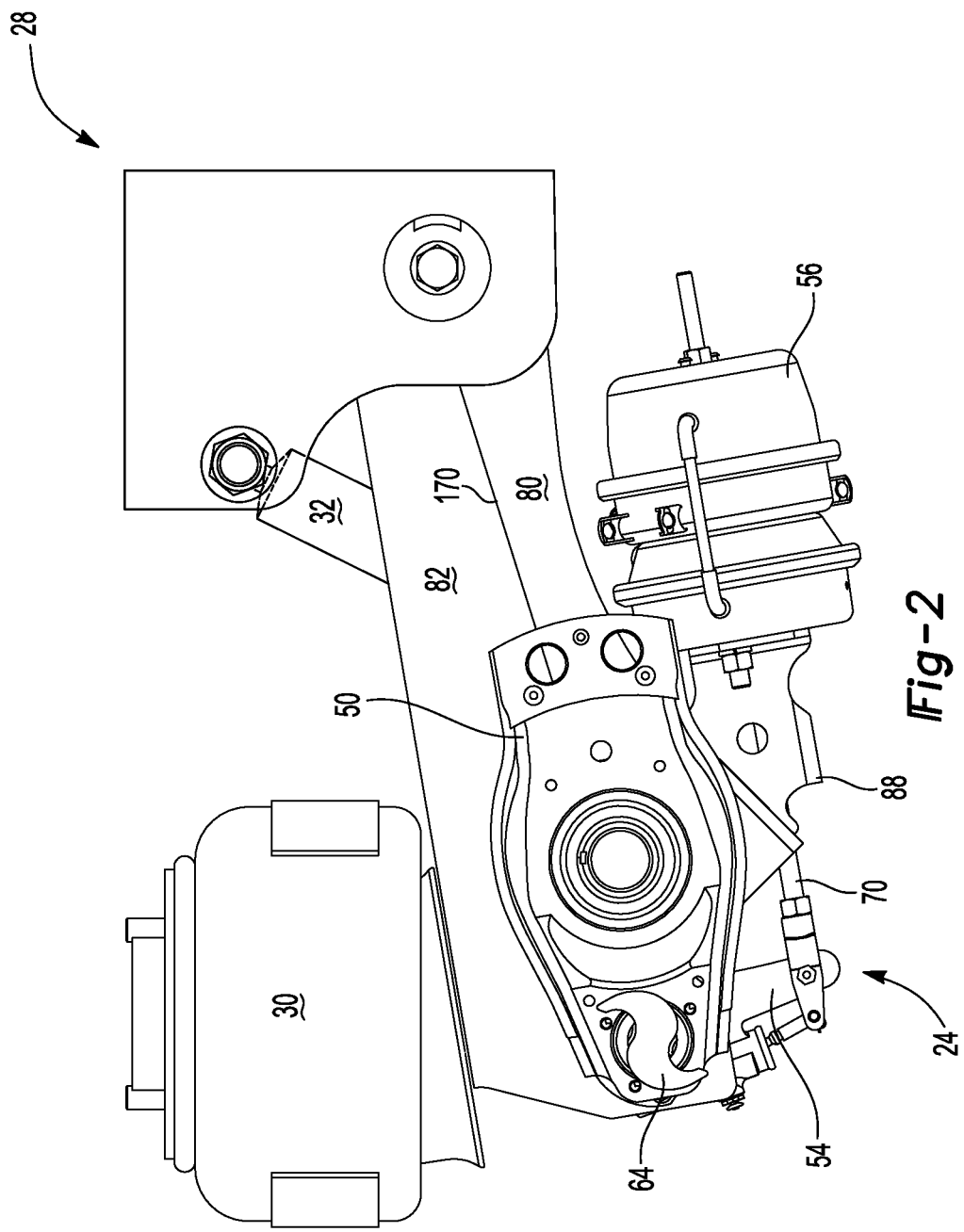
FIG. 2 is an end view of the axle suspension system of FIG. 1.

Referring to FIGS. 1 and 2, the brake subsystem 24 may be associated with a wheel hub assembly and the axle 20. The brake subsystem 24 may be configured to brake or inhibit rotation of an associated wheel hub assembly. The brake subsystem 24 may be mounted to the axle 20 proximate an end of the axle 20. The brake subsystem 24 may be configured as a friction brake, such as a drum brake assembly. The brake subsystem 24 may include a brake torque plate or a brake spider 50, a cam shaft 52, a slack adjuster 54, and an actuator 56.

The brake spider 50 may facilitate mounting of the brake assembly to the axle 20. The brake spider 50 may be disposed between the wheel hub assembly or an end of the axle 20 and the trailing arm assembly 26.

The cam shaft 52 may be mounted to the brake spider 50 proximate a first end 60 of the cam shaft 52 and may be mounted to the trailing arm assembly 26 at a second end 62 of the cam shaft 52 that may be disposed opposite the first end 60. The cam shaft 52 may extend substantially parallel to the axis 40 of the axle 20. The cam shaft 52 may include a brake cam 64, which may also be referred to as an S-cam. The brake cam 64 may be disposed proximate or at the second end 62 of the cam shaft 52. The brake cam 64 may be configured to actuate one or more brake pad assemblies when the cam shaft 52 is rotated or pivoted about its axis.

The slack adjuster 54 may be provided to compensate for friction brake wear or wear of friction material of a brake pad of the brake subsystem 24. The slack adjuster 54 may be fixedly disposed proximate the second end 62 of the cam shaft 52. The slack adjuster 54 may have a center bore that may be configured to receive the cam shaft 52. The center bore of the slack adjuster 54 and the cam shaft 52 may have mating splines that may be configured to couple the cam shaft 52 to the slack adjuster 54.

The actuator 56 may be provided to actuate the cam shaft 52 and ultimately the brake cam 64 to apply the friction brake. The actuator 56 may be of any suitable type, such as a pneumatic actuator or an electronic actuator. The actuator 56 may include an actuator shaft 70 that may extend to the slack adjuster 54. The actuator shaft 70 of the actuator 56 may move between a retracted position and an extended position. The cam shaft 52 and the brake cam 64 may be positioned such that the brake subsystem 24 may not inhibit rotation of an associated wheel hub assembly when the actuator shaft 70 is in the retracted position. The cam shaft 52 and the brake cam 64 may be rotated in response to extension of the actuator shaft 70 such that the brake subsystem 24 may inhibit rotation of an associated wheel hub assembly.

Figure 3:
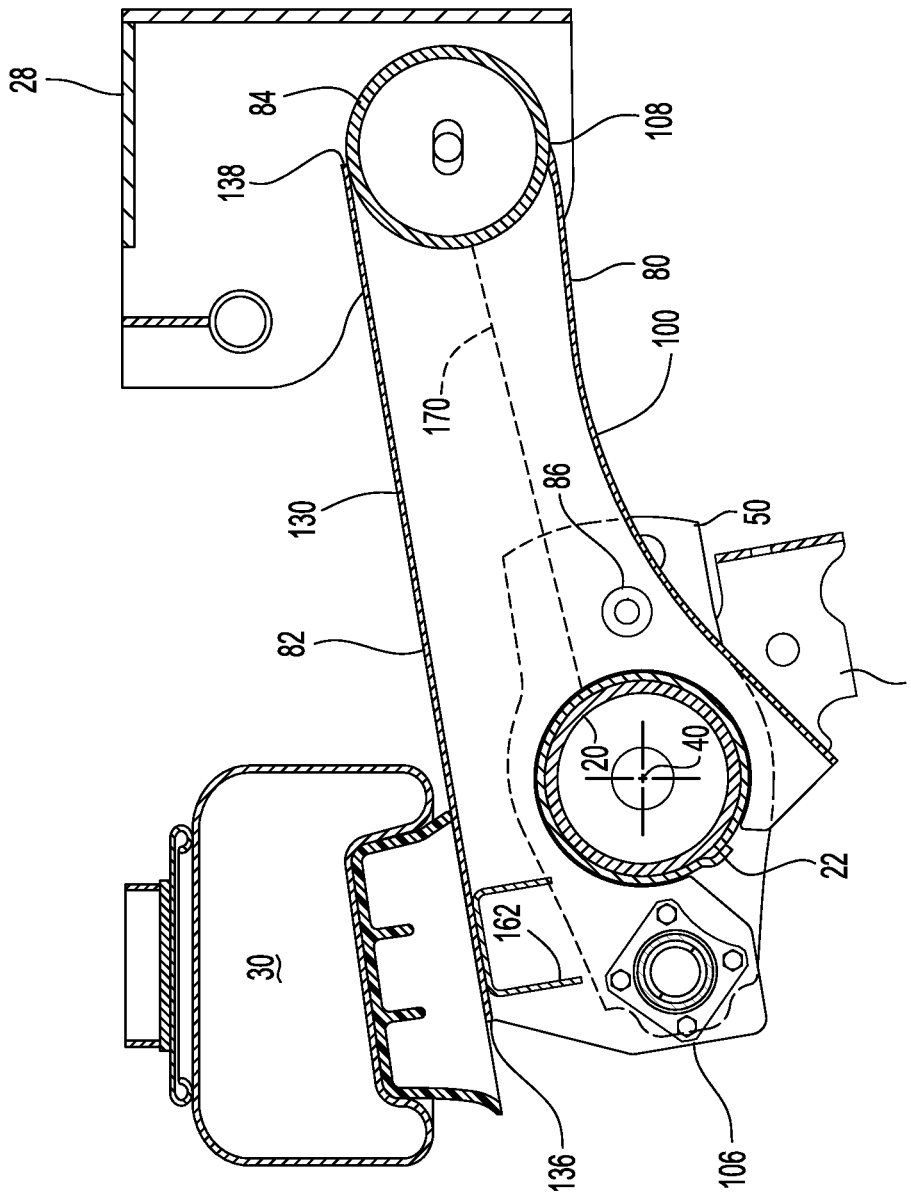
FIG. 3 is a cross-sectional view of the axle suspension system of FIG. 1 along section line 3-3.

Referring to FIGS. 3-5, the trailing arm assembly 26 may have a lower portion 80, an upper portion 82, a bushing ring 84, a shock absorber mounting tube 86, and an actuator bracket 88.

The lower portion 80 may generally make up the bottom half of the trailing arm assembly 26 and may have a unitary or one piece construction. In at least one embodiment, the lower portion 80 may have a substantially U-shaped cross-section and may have a lower intermediate wall 100, a first lower portion side wall 102, a second lower portion side wall 104, a first end 106, and a second end 108.

The lower intermediate wall 100 may extend from the first lower portion side wall 102 to the second lower portion side wall 104. The lower intermediate wall 100 may also extend from the bushing ring 84 toward the axle 20. At least a portion of the lower intermediate wall 100 may be disposed below the axle 20. For example, the lower intermediate wall 100 may be disposed below the axle 20, axle wrap 22, and the axis 40 of the axle 20 proximate the first end 106 of the lower portion 80. Moreover, the lower intermediate wall 100 may be completely spaced apart from the axle 20 and the axle wrap 22.

The first lower portion side wall 102 may extend from the lower intermediate wall 100. For instance, the first lower portion side wall 102 may extend from an end of the lower intermediate wall 100 and may extend toward the upper portion 82. In addition, the first lower portion side wall 102 may be disposed substantially perpendicular to the lower intermediate wall 100 or may extend substantially perpendicular away from the lower intermediate wall 100. The first lower portion side wall 102 may be substantially planar and may be disposed at a non-perpendicular angle relative to the axis 40 of the axle 20. In one or more embodiments, the first lower portion side wall 102 may include a first inner surface 110, a first outer surface 112, a mounting surface 114, and a mounting hole 116.

The first inner surface 110 may be disposed on the inside of the trailing arm assembly 26. For instance, the first inner surface 110 may face toward second lower portion side wall 104.

The first outer surface 112 may be disposed opposite the first inner surface 110. For instance, the first outer surface 112 may be disposed on the outside of the trailing arm assembly 26.

The mounting surface 114 may extend from first inner surface 110 to the first outer surface 112. The mounting surface 114 may be configured to engage and at least partially receive a portion of the axle 20 and/or the axle wrap 22. The mounting surface 114 may be disposed proximate the first end 106 of the lower portion 80. In at least one embodiment, the mounting surface 114 may have an arcuate or curved configuration and may be disposed between the first end 106 of the lower portion 80 and the mounting hole 116. The mounting surface 114 may optionally be configured as a flange that may extend outwardly from the first lower portion side wall 102 to provide increased surface area to facilitate mounting of the first lower portion side wall 102 to the axle wrap 22. The first lower portion side wall 102 may be fixedly disposed on the axle wrap 22 in any suitable manner, such as by welding.

The mounting hole 116 may extend from first inner surface 110 to the first outer surface 112. The mounting hole 116 may be configured to receive the shock absorber mounting tube 86. For example, the mounting hole 116 may be configured as a through hole through which the shock absorber mounting tube 86 may extend.

The second lower portion side wall 104 may be disposed opposite and completely spaced apart from the first lower portion side wall 102. The second lower portion side wall 104 may extend from the lower intermediate wall 100. For instance, the second lower portion side wall 104 may extend from an end of the lower intermediate wall 100 and may extend toward the upper portion 82. In addition, the second lower portion side wall 104 may be disposed substantially perpendicular to the lower intermediate wall 100 or may extend substantially perpendicular away from the lower intermediate wall 100.

As is best shown in FIG. 5, the first lower portion side wall 102 and the second lower portion side wall 104 may be disposed in a nonparallel relationship. The first lower portion side wall 102 may become progressively closer to the second lower portion side wall 104 in a direction that extends away from the first end 106 of the lower portion 80 and the axle wrap 22 and toward the second end 108 of the lower portion 80 and the bushing ring 84. As such, the first lower portion side wall 102 may be disposed at a non-parallel angle with respect to the second lower portion side wall 104. The second lower portion side wall 104 may be substantially planar and may be disposed in a plane that may be substantially perpendicular with respect to the axis 40 while the first lower portion side wall 102 may be disposed a plane that may not be disposed substantially perpendicular with respect to the axis 40 or a vertical or horizontal plane in which the axis 40 may be completely disposed. In one or more embodiments, the second lower portion side wall 104 may include a second inner surface 120, a second outer surface 122, a second mounting surface 124, and a second mounting hole 126.

Referring to FIGS. 4 and 5, the second inner surface 120 may be disposed on the inside of the trailing arm assembly 26. For instance, the second inner surface 120 may face toward the first lower portion side wall 102.

The second outer surface 122 may be disposed opposite the second inner surface 120. For instance, the second outer surface 122 may be disposed on the outside of the trailing arm assembly 26.

The second mounting surface 124 may extend from the second inner surface 120 to the second outer surface 122. The second mounting surface 124 may be configured to engage and at least partially receive a portion of the axle 20 and/or the axle wrap 22. The second mounting surface 124 may be disposed proximate the first end 106 of the lower portion 80. In at least one embodiment, the second mounting surface 124 may have an arcuate or curved configuration and may be disposed between the first end 106 of the lower portion 80 and the second mounting hole 126. The second mounting surface 124 may optionally be configured as a flange that may extend outwardly from the second lower portion side wall 104 to provide increased surface area to facilitate mounting of the second lower portion side wall 104 to the axle wrap 22. The second lower portion side wall 104 may be fixedly disposed on the axle wrap 22 along the second mounting surface 124 in any suitable manner, such as by welding.

The second mounting hole 126 may extend from second inner surface 120 to the second outer surface 122. The second mounting hole 126 may be configured to receive the shock absorber mounting tube 86. For example, the second mounting hole 126 may be configured as a through hole through which the shock absorber mounting tube 86 may extend.

The upper portion 82 may generally make up the top half of the trailing arm assembly 26 and may have a unitary or one piece construction. In at least one embodiment, the upper portion 82 may have a substantially U-shaped cross-section and may have an upper intermediate wall 130, a first upper portion side wall 132, a second upper portion side wall 134, a first end 136, and a second end 138.

The upper intermediate wall 130 may extend from the first upper portion side wall 132 to the second upper portion side wall 134. The upper intermediate wall 130 may also extend from the bushing ring 84 toward the axle 20. At least a portion of the upper intermediate wall 130 may be disposed above the axle 20. For example, the upper intermediate wall 130 may be disposed above the axle 20, axle wrap 22, and the axis 40 of the axle 20 proximate the first end 136 of the upper portion 82. Moreover, the upper intermediate wall 130 may be completely spaced apart from the axle 20 and the axle wrap 22.

The first upper portion side wall 132 may extend from the upper intermediate wall 130. For instance, the first upper portion side wall 132 may extend from an end of the upper intermediate wall 130 and may extend toward the lower portion 80. In addition, the first upper portion side wall 132 may be disposed substantially perpendicular to the upper intermediate wall 130 or may extend substantially perpendicular away from the upper intermediate wall 130. The first upper portion side wall 132 may be substantially planar and may be disposed at a non-perpendicular angle relative to the axis 40 of the axle 20. In one or more embodiments, the first upper portion side wall 132 may include a first inner surface 140, a first outer surface 142, and a mounting surface 144.

The first inner surface 140 may be disposed on the inside of the trailing arm assembly 26. For instance, the first inner surface 140 may face toward the second upper portion side wall 134.

The first outer surface 142 may be disposed opposite the first inner surface 140. For instance, the first outer surface 142 may be disposed on the outside of the trailing arm assembly 26.

The mounting surface 144 may extend from first inner surface 140 to the first outer surface 142. The mounting surface 144 may be configured to engage and at least partially receive a portion of the axle 20 and/or the axle wrap 22. The mounting surface 144 may be disposed proximate the first end 136 of the upper portion 82. In at least one embodiment, the mounting surface 144 may have an arcuate or curved configuration. The mounting surface 144 may optionally be configured as a flange that may extend outwardly from the first upper portion side wall 132 to provide increased surface area to facilitate mounting of the first upper portion side wall 132 to the axle wrap 22. The first upper portion side wall 132 may be fixedly disposed on the axle wrap 22 along the mounting surface 144 in any suitable manner, such as by welding.

The second upper portion side wall 134 may extend from the upper intermediate wall 130. For instance, the second upper portion side wall 134 may extend from an end of the upper intermediate wall 130 and may extend toward the lower portion 80. In addition, the second upper portion side wall 134 may be disposed substantially perpendicular to the upper intermediate wall 130 or may extend substantially perpendicular away from the upper intermediate wall 130.

The second upper portion side wall 134 may be disposed opposite and may be completely spaced apart from the first upper portion side wall 132. Like the first lower portion side wall 102 and the second lower portion side wall 104, the first upper portion side wall 132 and the second upper portion side wall 134 may be disposed in a nonparallel relationship. The first upper portion side wall 132 may become progressively closer to the second upper portion side wall 134 in a direction that extends away from the first end 136 of the upper portion 82 and the axle wrap 22 towards the second end 138 of the upper portion 82 and the bushing ring 84. The first upper portion side wall 132 and the second upper portion side wall 134 may each have an arcuate end surface 146 that may be disposed proximate the second and 138 of the upper portion 82.

The first upper portion side wall 132 may be disposed at an angle with respect to the second upper portion side wall 134. The second upper portion side wall 134 may be substantially planar and may be disposed at a substantially perpendicular with respect to the axis 40 of the axle 20.

In one or more embodiments, the second upper portion side wall 134 may include a second inner surface 150, a second outer surface 152, a second mounting surface 154, and a cam bracket opening 156.

The second inner surface 150 may be disposed on the inside of the trailing arm assembly 26. For instance, the second inner surface 150 may face toward the first upper portion side wall 132.

The second outer surface 152 may be disposed opposite the second inner surface 150. For instance, the second outer surface 152 may be disposed on the outside of the trailing arm assembly 26.

The second mounting surface 154 may extend from second inner surface 150 to the second outer surface 152. The second mounting surface 154 may be configured to engage and at least partially receive a portion of the axle 20 and/or the axle wrap 22. The second mounting surface 154 may be disposed proximate the first end 136 of the upper portion 82. In at least one embodiment, the second mounting surface 154 may have an arcuate or curved configuration and may be disposed between the second end 138 of the upper portion 82 and the cam bracket opening 156. The second mounting surface 154 may optionally be configured as a flange that may extend outwardly from the second upper portion side wall 134 to provide an increased surface area to facilitate mounting of the second upper portion side wall 134 to the axle wrap 22. The second upper portion side wall 134 may be fixedly disposed on the axle wrap 22 along the second mounting surface 154 in any suitable manner, such as by welding.

The cam bracket opening 156 may extend from the second inner surface 150 to the second outer surface 152. The cam bracket opening 156 may be configured to receive the cam shaft 52. For example, the cam bracket opening 156 may be configured as a through hole through which the second end 62 of the cam shaft 52 may extend. The cam bracket opening 156 may enable the cam shaft 52 to engage the slack adjuster 54.

Referring to FIG. 5, the upper portion 82 may include a stop feature 160. The stop feature 160 may be disposed on at least one of the first inner surface 140 and the second inner surface 150 of the upper portion 82. The stop feature 160 may be configured to engage at least one of the first lower portion side wall 102 and the second lower portion side wall 104. The stop feature 160 may be positioned to facilitate assembly and to provide the trailing arm assembly 26 with a predetermined height (h). The predetermined height may be measured from the lower intermediate wall 100 to the upper intermediate wall 130. The predetermined height may be based on a predetermined axle suspension system jounce travel target, height of the lower portion 80, and/or height of the upper portion 82. As the predetermined height increases, the wall thickness of the lower portion 80 and the wall thickness of the upper portion 82 may decrease. The decrease in the wall thicknesses of the lower portion 80 and the upper portion 82 may decrease the overall weight of the trailing arm assembly 26.

Referring to FIG. 3, the upper portion 82 may include a gusset 162. The gusset 162 may extend from the first inner surface 140 of the first upper portion side wall 132 to the second inner surface 150 of the second upper portion sidewall 134. The gusset 162 may be disposed proximate the first end 136 of the upper portion 82 and may engage a bottom surface of the upper intermediate wall 130. In at least one embodiment, the gusset 162 may be disposed between the first end 136 of the upper portion 82 and the cam bracket opening 156 and may be disposed directly below the air spring 30 and may not engage the axle 20 and axle wrap 22. The gusset 162 may provide structural support for at least a portion of the trailing arm assembly 26, such as the upper portion 82.

Referring to FIG. 5, the lower portion 80 may be received within the upper portion 82 such that the first lower portion side wall 102 and the second lower portion side wall 104 are both disposed between the first upper portion side wall 132 and the second upper portion side wall 134. The first outer surface 112 of the first lower portion side wall 102 may engage the first inner surface 140 of the first upper portion side wall 132. In addition, the second outer surface 122 of the second lower portion side wall 104 may engage the second inner surface 150 of the second upper portion side wall 134. At least one of the first lower portion side wall 102 and the second lower portion side wall 104 may engage the stop feature 160 when the lower portion 80 is received within the upper portion 82.

The upper portion 82 may be fixedly disposed on the lower portion 80 in any suitable manner, such as by welding. As is best shown in FIG. 3, the upper portion 82 may be joined to the lower portion 80 along an interface 170. The interface 170 may be a joining interface defined by the engagement of the first outer surface 112 of the first lower portion side wall 102 and the first inner surface 140 of the first upper portion side wall 132. In addition, an interface 170 may be defined by the engagement of the second outer surface 122 of the first lower portion side wall 102 and the second inner surface 150 of the second upper portion side wall 134. The interface 170 may define a neutral axis or low stress region of the trailing arm assembly 26 as the axle suspension system 10 is undergoing axle tramp. Axle tramp may be experienced when there are low-frequency load differences between a first end and a second end of the axle 20 such as when the first end and the second end of the axle 20 are at different heights.

The first end 106 of the lower portion 80 may be spaced apart from the first end 136 of the upper portion 82. The first end 106 of the lower portion 80 may be disposed below the axis 40 of the axle 20. The first end 136 of the upper portion 82 may be disposed above the axis 40 of the axle 20.

The second end 108 of the lower portion 80 may be disposed below the axis 40 of the axle 20. In at least one embodiment, second end 108 of the lower portion 80 may be disposed substantially parallel to the axis 40 of the axle 20. The second end 108 of the lower portion 80 and the second end 138 of the upper portion 82 may be disposed above the axis 40 of the axle 20.

Referring to FIGS. 3 and 4, the bushing ring 84 may be disposed proximate the second end 108 of the lower portion 80 and the second end 138 of the upper portion 82. As such, the bushing ring 84 may be disposed opposite the first end 106 of the lower portion 80 and opposite the first end 136 of the upper portion 82.

The bushing ring 84 may have an exterior surface 180 that may at least partially extend about a bushing ring axis 182. In at least one embodiment, the exterior surface 180 of the bushing ring 84 may extend continuously about the bushing ring axis 182. The bushing ring 84 may be configured to receive a torsional bushing that may be co-axially aligned with the bushing ring axis 182.

The second end 108 of the lower portion 80 may be configured to engage the exterior surface 180 of the bushing ring 84. More specifically, at least a portion of at least one of the lower intermediate wall 100, the first lower portion side wall 102, and the second lower portion side wall 104 may engage the exterior surface 180 of bushing ring 84. The second end 108 of the lower portion 80 may optionally be configured as a flange that may facilitate mounting of the lower portion 80 to the exterior surface 180 of the bushing ring 84. The lower portion 80 may be fixedly disposed on the exterior surface 180 of the bushing ring 84 in any suitable manner, such as by welding.

The second end 138 of the upper portion 82 may also be configured to engage the exterior surface 180 of the bushing ring 84. More specifically, the arcuate end surface 146 of the first lower portion side wall 102 and the second lower portion side wall 104 may engage the exterior surface 180 of bushing ring 84. The arcuate end surface 146 may optionally be configured as a flange that may extend outwardly to provide an increased surface area to facilitate mounting of the upper portion 82 to the exterior surface 180 of the bushing ring 84. The upper portion 82 may be fixedly disposed on the exterior surface 180 of the bushing ring 84 in any suitable manner, such as by welding.

Referring to FIGS. 3-5, the shock absorber mounting tube 86 may extend from the first lower portion side wall 102 to the second lower portion side wall 104. The shock absorber mounting tube 86 may be configured to receive a fastener that may pivotally mount the shock absorber 32 to the trailing arm assembly 26.

Referring to FIGS. 1-3, the hanger bracket 28 may be spaced apart from the axle 20 and may be pivotally mounted to the trailing arm assembly 26. For example, hanger bracket 28 may be pivotally mounted to the bushing ring 84 and the shock absorber 32 may be pivotally mounted to the hanger bracket 28. The hanger bracket 28 may interconnect the axle suspension system 10 with a vehicle, such as a motor vehicle or a trailer that may be provided with a motor vehicle.

The air spring 30 may be mounted to the trailing arm assembly 26. The air spring 30 may be mounted proximate the first end 136 of the upper portion 82. The air spring 30 may be provided with a spacer to connect the axle suspension system 10 to the vehicle. In at least one embodiment, the air spring 30 may be directly mounted to the upper portion 82 without a pedestal mount due to the predetermined height of the trailing arm assembly 26 that may accommodate for the pedestal mount.

The shock absorber 32 may be provided to dampen impulses and to dissipate kinetic energy experienced by the axle suspension system 10. The shock absorber 32 may be pivotally mounted to the hanger bracket 28 at a first end. The shock absorber 32 may be pivotally mounted to the shock absorber mounting tube 86 of the lower portion 80 at a second end.

The actuator bracket 88 may be disposed on the lower portion 80. The actuator bracket 88 may engage the lower intermediate wall 100 proximate the first end 106 of the lower portion 80. The actuator bracket 88 may be configured to receive or mount the actuator 56 to the lower portion 80 of the trailing arm assembly 26.

The axle suspension system 10 may be made or assembled in various ways. An example of a method of making or assembling an axle suspension system is as follows.

First, the axle wrap 22 may be fixedly mounted on the exterior surface 42 of the axle 20. The axle wrap 22 may extend completely around the exterior surface 42 of the axle 20 or may extend partially around the exterior surface 42 of the axle 20. The axle wrap 22 may be joined to the exterior surface 42 of the axle 20 in any suitable manner, such as by welding or brazing.

Next, the brake spider 50 may be fixedly mounted on the axle 20. The brake spider 50 may be disposed proximate an end of the axle 20 and spaced apart from the trailing arm assembly 26. The brake spider 50 may be disposed substantially perpendicular to the axis 40 of the axle 20 and may be joined to the axle 20 in any suitable manner, such as by welding or brazing. The brake spider 50 may be mounted to the axle 20 prior to assembling the trailing arm assembly 26 to the axle wrap 22.

Next, the trailing arm assembly 26 may be assembled to the axle wrap 22. The trailing arm assembly 26 may be assembled by positioning the upper portion 82 and the lower portion 80 on the axle wrap 22 as previously described. The upper portion 82 and the lower portion 80 may be positioned such that the axle wrap 22 may disposed between the upper portion 82 and the lower portion 80. The lower intermediate wall 100 and the upper intermediate wall 130 may be spaced apart from the axle wrap 22 when the lower portion 80 and the upper portion 82 are positioned on the axle wrap 22. The lower intermediate wall 100 and the upper intermediate wall 130 may be disposed on opposite sides the axis 40 of the axle 20.

Next, the upper portion 82 and the lower portion 80 may be joined to each other and to the axle wrap 22. The upper portion 82 and the lower portion 80 may be joined by a metal joining process such as by welding, brazing, fasteners, or other methods known to those of ordinary skill in the art.

A trailing arm assembly 26 having a lower portion 80 and an upper portion 82 as described above may improve assembly efficiency and may permit the trailing arm assembly 26 to be mounted to the axle 20 or axle wrap 22 after other components are installed on the axle 20 that may otherwise interfere with sliding a preassembled trailing arm assembly 26 along the axle 20, such as the brake spider 50 and the like. Additionally, the joining of the upper portion 82 to the lower portion 80 proximate the joining interface 170 may improve the fatigue life of the trailing arm assembly 26. The fatigue life of the trailing arm assembly 26 may be improved as compared to joining the upper portion 82 to the lower portion 80 at other locations or by directly joining a single piece trailing arm to an axle 20.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle suspension system comprising:
    an axle that extends along an axis;
    an axle wrap disposed on the axle; and
    a trailing arm assembly disposed on the axle wrap, the trailing arm assembly including:
        a lower portion having a lower intermediate wall, a first lower portion side wall that extends from the lower intermediate wall, and a second lower portion side wall that extends from the lower intermediate wall and is disposed opposite the first lower portion side wall, wherein the first lower portion side wall and the second lower portion side wall are disposed on the axle wrap; and
        an upper portion that is fixedly disposed on the lower portion, the upper portion having an upper intermediate wall, a first upper portion side wall that extends from the upper intermediate wall, and a second upper portion side wall that extends from the upper intermediate wall and is disposed opposite the first upper portion side wall, wherein the first upper portion side wall and the second upper portion side wall are disposed on the axle wrap;
    wherein the lower intermediate wall and the upper intermediate wall are spaced apart from the axle wrap and are disposed on opposite sides of the axis such that the upper intermediate wall does not engage the axle wrap.

2. The axle suspension system of claim 1 wherein the first lower portion side wall and the second lower portion side wall extend substantially perpendicular from the lower intermediate wall.

3. The axle suspension system of claim 1 wherein the lower portion is received within the upper portion such that the first lower portion side wall and the second lower portion side wall are both disposed between the first upper portion side wall and the second upper portion side wall.

4. An axle suspension system comprising:
    an axle that extends along an axis;
    an axle wrap disposed on the axle; and
    a trailing arm assembly disposed on the axle wrap, the trailing arm assembly including:
        a lower portion having a lower intermediate wall, a first lower portion side wall that extends from the lower intermediate wall, and a second lower portion side wall that extends from the lower intermediate wall and is disposed opposite the first lower portion side wall, wherein the first lower portion side wall and the second lower portion side wall are disposed on the axle wrap; and an upper portion that is fixedly disposed on the lower portion, the upper portion having an upper intermediate wall, a first upper portion side wall that extends from the upper intermediate wall, and a second upper portion side wall that extends from the upper intermediate wall and is disposed opposite the first upper portion side wall, wherein the first upper portion side wall and the second upper portion side wall are disposed on the axle wrap;

wherein the lower intermediate wall and the upper intermediate wall are spaced apart from the axle wrap and are disposed on opposite sides of the axis and the second upper portion side wall includes a cam bracket opening that receives a cam shaft.

5. The axle suspension system of claim 4 further comprising an actuator bracket that receives an actuator that actuates the cam shaft, wherein the actuator bracket engages the lower intermediate wall.

6. The axle suspension system of claim 1 further comprising a hanger bracket, wherein the trailing arm assembly is pivotally attached to the hanger bracket.

7. An axle suspension system comprising:
an axle that extends along an axis;
an axle wrap disposed on the axle;
a trailing arm assembly disposed on the axle wrap, the trailing arm assembly including:
  a lower portion having a lower intermediate wall, a first lower portion side wall that extends from the lower intermediate wall, and a second lower portion side wall that extends from the lower intermediate wall and is disposed opposite the first lower portion side wall, wherein the first lower portion side wall and the second lower portion side wall are disposed on the axle wrap; and
  an upper portion that is fixedly disposed on the lower portion, the upper portion having an upper intermediate wall, a first upper portion side wall that extends from the upper intermediate wall, and a second upper portion side wall that extends from the upper intermediate wall and is disposed opposite the first upper portion side wall, wherein the first upper portion side wall and the second upper portion side wall are disposed on the axle wrap; and
a hanger bracket, wherein the trailing arm assembly is pivotally attached to the hanger bracket;
wherein the lower intermediate wall and the upper intermediate wall are spaced apart from the axle wrap and are disposed on opposite sides of the axis and the first upper portion side wall and the second upper portion side wall are disposed in a nonparallel relationship such that the first upper portion side wall becomes progressively closer to the second upper portion side wall in a direction that extends from the axle wrap toward a bushing ring that is disposed proximate the hanger bracket.

8. An axle suspension system comprising:
an axle that extends along an axis;
an axle wrap disposed on the axle;
a trailing arm assembly disposed on the axle wrap, the trailing arm assembly including:
  a lower portion having a lower intermediate wall, a first lower portion side wall that extends from the lower intermediate wall, and a second lower portion side wall that extends from the lower intermediate wall and is disposed opposite the first lower portion side wall, wherein the first lower portion side wall and the second lower portion side wall are disposed on the axle wrap; and
  an upper portion that is fixedly disposed on the lower portion, the upper portion having an upper intermediate wall, a first upper portion side wall that extends from the upper intermediate wall, and a second upper portion side wall that extends from the upper intermediate wall and is disposed opposite the first upper portion side wall, wherein the first upper portion side wall and the second upper portion side wall are disposed on the axle wrap; and
a hanger bracket, wherein the trailing arm assembly is pivotally attached to the hanger bracket;
wherein the lower intermediate wall and the upper intermediate wall are spaced apart from the axle wrap and are disposed on opposite sides of the axis and the first lower portion side wall and the second lower portion side wall are disposed in a nonparallel relationship such that the first lower portion side wall becomes progressively closer to the second lower portion side wall in a direction that extends from the axle wrap toward a bushing ring that is disposed proximate the hanger bracket.

9. An axle suspension system comprising:
an axle that extends along an axis;
an axle wrap that is fixedly disposed on the axle and extends at least partially around the axle;
a trailing arm assembly fixedly disposed on the axle wrap, the trailing arm assembly including:
  a lower portion that includes:
    a bushing ring that extends continuously about a bushing ring axis, wherein the bushing ring is disposed at an end of the lower portion that is disposed opposite the axle wrap;
    first and second lower portion side walls that extend from the bushing ring to the axle wrap; and
    a lower intermediate wall that extends from the first lower portion side wall to the second lower portion side wall, wherein the lower intermediate wall does not engage the axle wrap;
  an upper portion that is fixedly disposed on the lower portion, wherein the upper portion includes first and second upper portion side walls that extend from the bushing ring to the axle wrap; and
a hanger bracket that is spaced apart from the axle and pivotally mounted to the trailing arm assembly proximate the bushing ring.

10. The axle suspension system of claim 9 wherein the upper portion includes an upper intermediate wall that extends from the first upper portion side wall to the second upper portion side wall.

11. The axle suspension system of claim 10 wherein the lower intermediate wall is disposed below the axle and the upper intermediate wall is disposed above the axle.

12. The axle suspension system of claim 10 wherein the upper intermediate wall engages the bushing ring.

13. An axle suspension system comprising:
an axle that extends along an axis;
an axle wrap that is fixedly disposed on the axle and extends at least partially around the axle;
a trailing arm assembly fixedly disposed on the axle wrap, the trailing arm assembly including:
  a lower portion that includes:
    a bushing ring that extends continuously about a bushing ring axis, wherein the bushing ring is disposed at an end of the lower portion that is disposed opposite the axle wrap; and first and second lower portion side walls that extend from the bushing ring to the axle wrap; and an upper portion that is fixedly disposed on the lower portion, wherein the upper portion includes first and second upper portion side walls that extend from the bushing ring to the axle wrap; and a hanger bracket that is spaced apart from the axle and pivotally mounted to the trailing arm assembly proximate the bushing ring;

wherein an outer surface of the first lower portion side wall engages an inner surface of the first upper portion side wall and an outer surface of the second lower portion side wall engages an inner surface of the second upper portion side wall.

14. The axle suspension system of claim 9 wherein the first upper portion side wall and the second upper portion side wall each have an arcuate end surface that engages the bushing ring.

15. The axle suspension system of claim 9 wherein the second upper portion side wall is substantially planar and is disposed substantially perpendicular to the axis and the first upper portion side wall is substantially planar and is disposed at a non-perpendicular angle relative to the axis.

16. A method of making an axle suspension system comprising:

fixedly mounting an axle wrap on an axle;

assembling a trailing arm assembly having an upper portion and a lower portion to the axle wrap by positioning the upper portion and the lower portion on the axle wrap such that the axle wrap is disposed between the upper portion and the lower portion, wherein the lower portion has a lower intermediate wall, the upper portion has an upper intermediate wall that is disposed opposite the lower intermediate wall, and the lower intermediate wall and the upper intermediate wall are spaced apart from the axle wrap such that the lower intermediate wall does not engage the axle wrap when the upper portion and the lower portion are positioned on the axle wrap; and joining the upper portion and the lower portion to each other and to the axle wrap.

17. The method of claim 16 wherein the lower portion has first and second lower portion side walls that extend from the lower intermediate wall, and the upper portion has first and second upper portion side walls that extend from the upper intermediate wall, wherein the first and second lower portion side walls are received between the first and second upper portion side walls when the upper portion and the lower portion are positioned on the axle wrap.

18. The method of claim 16 further comprising mounting a brake spider on the axle prior to assembling the trailing arm assembly to the axle wrap.

19. The axle suspension system of claim 10 wherein the upper intermediate wall does not engage the axle wrap.

\* \* \* \* \*